(12) United States Patent  
Yoon et al.

(10) Patent No.: US 8,859,663 B2  
(45) Date of Patent: Oct. 14, 2014

(54) CALCIUM CARBONATE HAVING A SURFACE CHARGE, THE PREPARING PROCESS THEREOF AND FILLER FOR PRODUCING A PAPER USING THE SAME

(75) Inventors: Dong Ho Yoon, Woolsan-shi (KR); Seong Dal Heo, Woolsan-shi (KR); Seung Suk Seo, Sungnam-shi (KR); In Woo Cheong, Daegu-shi (KR)

(73) Assignee: Hankuk Paper Mfg. Co., Ltd., Seoul (KR)

( * ) Notice: Subject to any disclaimer, the term of this patent is extended or adjusted under 35 U.S.C. 154(b) by 268 days.

(21) Appl. No.: 13/426,250

(22) Filed: Mar. 21, 2012

(65) Prior Publication Data

US 2013/0164206 A1   Jun. 27, 2013

(30) Foreign Application Priority Data

Dec. 27, 2011 (KR) .......................... 10-2011-0143108

(51) Int. Cl.
*C08K 3/26* (2006.01)
*C01F 11/18* (2006.01)

(52) U.S. Cl.
USPC ............. 524/425; 423/432; 423/430; 423/69; 423/6

(58) Field of Classification Search
CPC ........................................................ C08K 3/26
USPC ................................... 524/425; 423/432, 430
See application file for complete search history.

(56) References Cited

U.S. PATENT DOCUMENTS

2006/0003117 A1*  1/2006  Superka et al. ............ 428/32.37
2010/0200185 A1*  8/2010  Sakai et al. ................ 162/164.6

* cited by examiner

*Primary Examiner* — Michael M Bernshteyn
(74) *Attorney, Agent, or Firm* — Arent Fox LLP

(57) ABSTRACT

The present invention relates to a calcium carbonate having a surface charge, the preparing process thereof and filler for producing a paper using the same. The present invention provides the process of preparing a calcium carbonate having a surface charge, characterized in that it comprises the following steps of: preparing a solution mixture of one or more monomer selected from the group consisting of calcium hydroxide, acrylic acid, acrylamide, or [2-(acryloyloxy) ethyl]-trimethylammonium chloride; removing dissolved gases such as oxygen and carbon dioxide in the said solution by injecting nitrogen ($N_2$) gas; adjusting pH of the said solution; and inducing a reaction by adding polymerization initiator of a high molecule while injecting carbon dioxide to the said mixture.

4 Claims, 4 Drawing Sheets

CALCIUM CARBONATE HAVING A SURFACE CHARGE, THE PREPARING PROCESS THEREOF AND FILLER FOR PRODUCING A PAPER USING THE SAME

FIELD OF THE INVENTION

The present invention relates to a calcium carbonate having a surface charge, the preparing process thereof and filler for producing a paper using the same, and more particularly the present invention relates to a calcium carbonate having a surface charge which can be effectively applied to a paper industry by searching an element that affects to a crystal structure and shape of a calcium carbonate via a research for transformation of shape of a calcium carbonate through a carbonic acid saturation process and a simultaneous reaction of a high molecule, the preparing process thereof, and filler for producing a paper using the same.

DESCRIPTION OF THE PRIOR ART

Generally, a calcium carbonate can be classified with a precipitated calcium carbonate (PCC) which is obtained by chemical precipitating reaction, and a ground calcium carbonate (GCC) which is obtained by smashing and pulverizing limestone of crystalline structure physically according to a preparing method. Then, up to now, a ground calcium carbonate had been mainly used as filler for producing a paper. However, the said ground calcium carbonate has been gradually replacing with a precipitated calcium carbonate having functionality due to a merit that it can be easy to control a shape and a configuration of particle and to maintain a homogeneous particle size. The crystal configuration of such precipitated calcium carbonate is generally separated to calcite crystalline, aragonite crystalline, vaterite crystalline and the like, which the former two kinds are cubic system and orthorhombic system whose crystal configuration is absolutely different and the said vaterite crystalline is most instable so that it is difficult to exist at state of nature.

The precipitated calcium carbonate which has been widely used at a paper industry is calcite crystalline, which has fusiform, cubic form, sphere form and the like. With an experimental synthetic method of a precipitated calcium carbonate, Soda Process or Gas Diffusion Techniques using calcium chloride and carbonate solution, Carbonation Process and the Method using a supersaturated calcium carbonate and carbon dioxide bubble have been mainly used. Being more specifically described the principle for preparing the said precipitated calcium carbonate, Carbonation Process, Lime Soda Process, and Soda Process and Solvay Process can be typically proposed as followings:

Carbonation Process

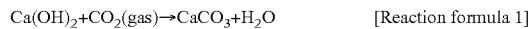   [Reaction formula 1]

Lime Soda Process

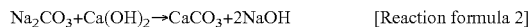   [Reaction formula 2]

Soda Process And Solvay Process

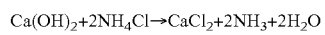

   [Reaction formula 3]

Using the said Reaction formula, crystal structure and shape may be affected by temperature, concentration and additives during formation of a precipitated calcium carbonate. While it has been known that, in case of the high molecular having carboxylic acid among the organic additives, for example polyacrylic acid, crystal structure and shape of a precipitated calcium carbonate be mainly affected by length, concentration and temperature of the high molecular, there are hardly known for concrete correlation of each factors and the like in case of producing a calcium carbonate using the other method so that it can not control the calcium carbonate to be produced with a desired state. In the other word, the disclosed some reports and literatures are for effect of crystal shape and size variation of a precipitated calcium carbonate by using the synthesized polymers; however, there are not any disclosed studies and literatures for shape variation of a calcium carbonate through carbonation process with in situ polymerization, namely a carbonic acid saturation process and a simultaneous reaction of a high molecule.

SUMMARY OF THE INVENTION

Accordingly, the present invention has been made in view of the problems occurring in the prior art, and it is the main purpose of; the present invention to provide a calcium carbonate having a surface charge which can be effectively applied to a paper industry by searching an element that affects to a crystal structure and shape of a calcium carbonate via a research for transformation of shape of a calcium carbonate through a carbonic acid saturation process and a simultaneous reaction of a high molecule.

Another object of the present invention is to provide the preparing process which can more easily produce a calcium carbonate having a surface charge having the said excellent properties.

Another object of the present invention is to provide the filler for producing a paper using a calcium carbonate having a surface charge having the said excellent properties.

Still another object of the present invention is to achieve other objects which can be easily conceived by a person skilled in the art from the above-described clear objects and the description of the specification of the present invention.

The said objects of the present invention can be achieved by investigating the fact that the electrical properties of a precipitated calcium carbonate whose surface is modified are different depending on reaction order and the kinds of monomers of high molecular produced by processing simultaneously a carbonic acid saturation process and a polymerization of a high molecule as an experiment which synthesize a special composite with an organic high molecular and a calcium carbonate, that crystal structure and shape of a precipitated calcium carbonate can be controlled according to the degree synthesized by the above-mentioned method depending on reacting time, and so that controlled size and shape can be produced according to application, and this makes it possible to apply with various usage in the paper industry by adding the functionalities to a high molecules.

To achieve the above objects, in one aspect, the present invention provides the process of preparing a calcium carbonate having a surface charge, characterized in that it comprises the following steps of:

preparing a solution mixture of one or more monomer selected from the group consisting of calcium hydroxide, acrylic acid, acrylamide, or [2-(acryloyloxy)ethyl]-trimethylammonium chloride;

removing dissolved gases such as oxygen and carbon dioxide in the said solution by injecting nitrogen ($N_2$) gas;

adjusting pH of the said solution; and inducing a reaction by adding polymerization initiator of a high molecule while injecting carbon dioxide to the said mixture.

In a preferred embodiment of the present invention, the said process further comprises, after reaction of the last step, the additional step of reacting with addition of mixture of one or more monomer selected from the group consisting of acrylic acid, acrylamide, or [2-(acryloyloxy)ethyl]-trimethylammonium chloride.

In a preferred embodiment of the present invention, the said initiator is ammonium persulfate.

In a preferred embodiment of the present invention, the said process further comprises the steps of washing a formed crystalline by precipitation after ending a crystallization reaction, and of drying it.

In another aspect, the present invention provides the calcium carbonate having a surface charge, characterized in that it is produced by steps of:

preparing a solution mixture of one or more monomer selected from the group consisting of calcium hydroxide, acrylic acid, acrylamide, or [2-(acryloyloxy)ethyl]-trimethylammonium chloride;

removing dissolved gases such as oxygen and carbon dioxide in the said solution by injecting nitrogen ($N_2$) gas;

adjusting pH of the said solution; and inducing a reaction by adding polymerization initiator of a high molecule while injecting carbon dioxide to the said mixture.

In another aspect, the present invention provides the filler for producing a paper using a calcium carbonate having a surface charge, characterized in that the said filler uses a precipitated calcium carbonate obtained by steps of:

preparing a solution mixture of one or more monomer selected from the group consisting of calcium hydroxide, acrylic acid, acrylamide, or [2-(acryloyloxy)ethyl]-trimethylammonium chloride;

removing dissolved gases such as oxygen and carbon dioxide in the said solution by injecting nitrogen ($N_2$) gas;

adjusting pH of the said solution; and inducing a reaction by adding polymerization initiator of a high molecule while injecting carbon dioxide to the said mixture.

Being constituting as the above, the present invention provides the calcium carbonate having a surface charge which can be effectively applied to a paper industry by searching an element that affects to a crystal structure and shape of a calcium carbonate via a research for transformation of shape of a calcium carbonate through a carbonic acid saturation process and a simultaneous reaction of a high molecule, being able to produce a calcium carbonate having a controlled size and shape depending on application with the above investigation, and providing functionalities with a high molecular to apply the produced calcium carbonate effectively with a fixing agent and a retention agent for producing a paper which agglomerate a pulp and a filler.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Hereinafter, the present invention will be described in further detail with reference to preferred embodiments. It is to be understood, however, that the scope of the present invention is not limited to these embodiments.

Figure 1A:
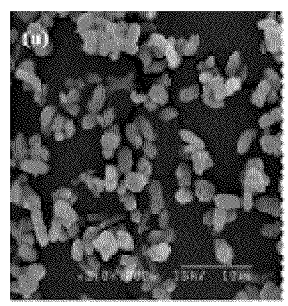
FIG. 1 is a scanning electron microscopy showing a procedure of crystal formation over time of PCC-PAA, a calcium carbonate whose surface is charged with negative (−), and which is produced through a carbonic acid saturation process and a simultaneous reaction of a high molecule in accordance with one embodiment of the present invention, wherein (a) is one at 10 minutes, (b) is one at 30 minutes, (c) is one at 60 minutes, (d) is one at 120 minutes of reacting time and at 3,000 times of magnification, and (e-h) are at the same reacting time as the above and at 10,000 times of magnification, respectively.
Figure 1B:
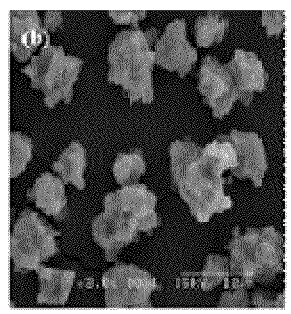
Figure 1C:
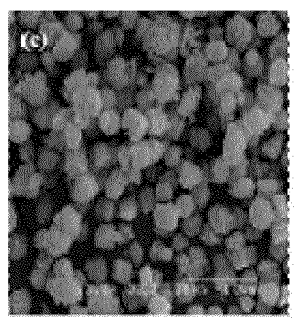
Figure 1D:
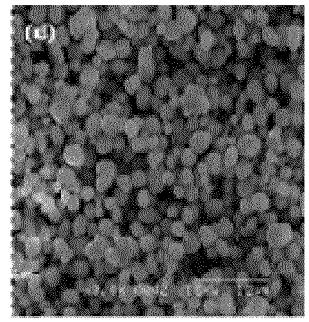
Figure 1E:
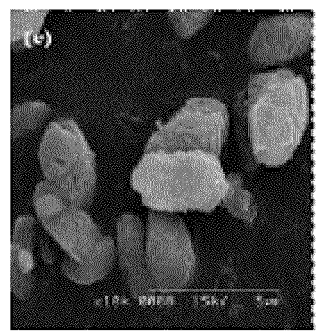
Figure 1F:
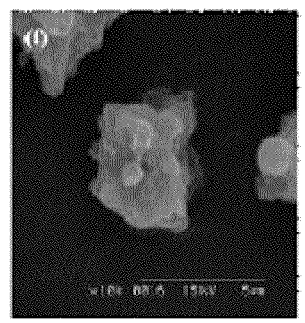
Figure 1G:
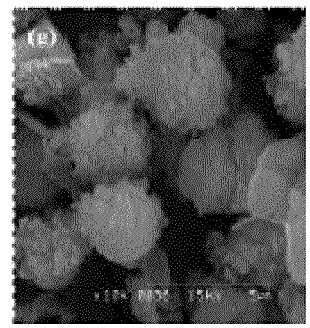
Figure 1H:
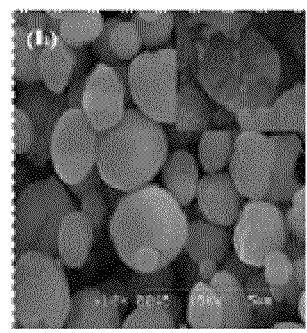
Figure 2:
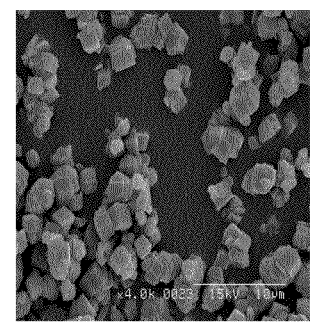
FIG. 2 is a scanning electron microscopy showing a reactant at 180 minutes of PCC-PAM, a calcium carbonate whose surface is charged with positive (+), and which is produced through a carbonic acid saturation process and a simultaneous reaction of a high molecule in accordance with one embodiment of the present invention.
Figure 3:
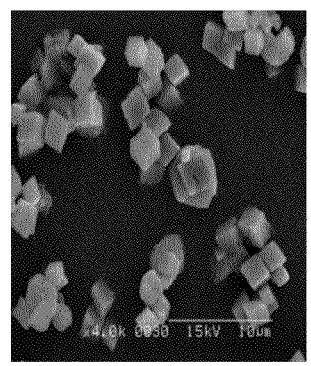
FIG. 3 is a scanning electron microscopy showing a reactant at 180 minutes of PCC-PAA-PAM-AOTAC, a calcium carbonate whose surface is charged with positive (+), and which is produced through a carbonic acid saturation process and a simultaneous reaction of a high molecule in accordance with one embodiment of the present invention.

FIG. 1 is a scanning electron microscopy showing a procedure of crystal formation over time of PCC-PAA, a calcium carbonate whose surface is charged with negative (−), and which is produced through a carbonic acid saturation process and a simultaneous reaction of a high molecule in accordance with one embodiment of the present invention, FIG. 2 is a scanning electron microscopy showing a reactant at 180 minutes of PCC-PAM, a calcium carbonate whose surface is charged with positive (+), and which is produced through a carbonic acid saturation process and a simultaneous reaction of a high molecule in accordance with one embodiment of the present invention, and FIG. 3 is a scanning electron microscopy showing a reactant at 180 minutes of PCC-PAA-PAM-AOTAC, a calcium carbonate whose surface is charged with positive (+), and which is produced through a carbonic acid saturation process and a simultaneous reaction of a high molecule in accordance with one embodiment of the present invention.

As being shown each figure, according to the present invention, it had been compared for a crystal structure and shape of a precipitated calcium carbonate which is prepared through a carbonic acid saturation process and a simultaneous reaction of a high molecule (in situ polymerization). While an initiator and a monomer do not affect to a crystal structure and shape reportedly, we can see that the growing polymer through in situ polymerization affects to a crystal shape.

Also, the prepared calcium carbonate represents different mode according to a kind of monomer. For example, shape variation of a calcium carbonate may be affected in case of presenting acrylic group such as acrylic acid, but acrylamide dose not affect to shape variation.

A crystal shape of a calcium carbonate which is produced with in situ polymerization of acrylic acid is converted from vaterite to calcite, and its form also is converted from a form pf plate to a form of egg. Namely, a crystal shape of a calcium carbonate had been changed over time due to a high molecular which is generated by carrying out a synthesis of a calcium carbonate and in situ polymerization simultaneously. It can be seen that such phenomenon occurs when concentration of acrylic acid is higher than that of calcium ion.

According to a preferred embodiment of the present invention, a crystal shape of a precipitated calcium carbonate which is produced with a carbonic acid saturation process and in situ polymerization of high molecule had been converted from a general form of calcite to a special form of an oval. Therefore, we can see from the said result that the polymer during polymerization plays role of a controller of crystal shape of a calcium carbonate, and more particularly a shape of crystal particles of a calcium carbonate is affected by concentration of acrylic acid. Also, a form of crystal particles of a calcium carbonate is transformed from thin plate to an oval crystalline of the same size via an amorphous calcite, and we can see from such result that a high molecular of acrylic acids which is generated with a large amount of enough to cover crystal particles of a calcium carbonate affects to transformation of crystal shape of a calcium carbonate.

Furthermore, it has been discovered that a surface modification of a precipitated calcium carbonate which is produced with a carbonic acid saturation process and in situ polymerization of high molecule according to the present invention may be changed depending on a kind of monomer being used at a polymerization of high molecule and an order of reaction.

Also, as being shown the below table 1, it has been demonstrated that acrylamide or [2-(acryloyloxy)ethyl]-trimethylammonium chloride (AOTAC) during polymerization of high molecule should be used to form positive charge (+) at the surface of a calcium carbonate, and acrylic acid (AA) should be used to modify the surface of a calcium carbonate with negative charge (−) according to the present invention.

into a reactor of double jacket, and then nitrogen gas ($N_2$) is injected at flow of 300 mL/min to the said solution to remove the dissolved oxygen and carbon dioxide and the like. The said solution is adjusted at pH of 7.0 by using sodium hydroxide, and then stirred during about 30 minutes.

A reaction is initiated by infusing carbon dioxide with a speed of 300 mL/min to the prepared solution of calcium hydroxide of 45° C. A sample is taken at 180 minutes after reaction by infusing carbon dioxide. At 3 hours after initiation of reaction, pH of the reacting solution is 5.6. The precipitate of a calcium carbonate is washed above 5 times, and dried at room temperature during about 12 hours to obtain a precipitated calcium carbonate.

EXAMPLE 1

Crystallization of Simultaneous Reactant of A Precipitated Calcium Carbonate And Acrylic Acid (PCC-PAA)

Firstly, to prepare synthesis of a polymer and a calcium carbonate, 22.7 mM of calcium hydroxide and 420 mM of acrylic acid in 200 mL of solution is introduced into a reactor of double jacket, and then nitrogen gas ($N_2$) is injected at flow of 300 mL/min to the said solution to remove the dissolved oxygen and carbon dioxide and the like. The said solution is adjusted at pH of 7.0 by using sodium hydroxide, and then stirred during about 30 minutes. Then, 1 mL of ammonium persulfate, an initiator, is prepared with 0.5 mM of concentration.

TABLE 1

| Item | Unit | PCC | PCC-PAA | PCC-PAM | PCC-PAA-PAM | PCC-PAA, PAM | PCC-PAA-PAM-AOTAC | PCC-PAA, PAM-AOTAC | PCC-PAA, PAM-AOTAC |
|---|---|---|---|---|---|---|---|---|---|
| AA/AM/AOTAC | % | — | 3/—/— | —/3/— | 1.5/1.5/— | 1.5/1.5/— | 1.2/1.2/0.8 | 1.2/1.2/0.8 | 0.8/1.2/1.2 |
| PCC grain size | μm | 12.3 | 4.1 | 3.7 | 8.3 | 2.0 | 0.7 | 4.0 | 3.4 |
| Z-Potential | mV | −4.02 | −20.20 | −1.50 | −8.33 | −7.58 | −8.80 | 3.78 | 12.25 |

The calcium carbonate produced by the present invention can be applied to a fixing agent and a retention agent for producing a paper which agglomerate a pulp and a filler (GCC, PCC, talc, etc).

Hereinafter, the present invention will be described in detail with reference to the following examples, but the scope of the present invention is not limited to those examples.

Firstly, the testing materials are as followings which are used at the following examples proposed to explain the present invention.

Testing Materials:

Calcium hydroxide ($Ca(OH)_2$), Acrylic Acid, Acrylamide, [2-(acryloyloxy)ethyl]-trimethylammonium chloride), and Ammonium Persulfate; Regents of first grade produced by Aldrich Inc.;

Sodium hydroxide (NaOH): Products produced by Duksan Pharmaceutical Industry Limited (Korea);

Carbon dioxide: Purity of 99.5%;

Nitrogen: Purity of 99.999%;

All used water: the deionized water.

PREPARATIVE EXAMPLE

Crystallization of A Precipitated Calcium Carbonate (PCC)

Firstly, to prepare synthesis of a calcium carbonate, 22.7 mM of calcium hydroxide in 200 mL of solution is introduced A reaction is initiated by infusing carbon dioxide with a speed of 300 mL/min to the prepared solution of calcium hydroxide and acrylic acid of 45° C., A sample is taken at 180 minutes after reaction by adding ammonium persulfate which is an initiator for synthesis of high molecular while infusing carbon dioxide. At 3 hours after initiation of reaction, the precipitate of a calcium carbonate is washed above 5 times, and dried at room temperature during about 12 hours to obtain a precipitated polymer and a calcium carbonate.

EXAMPLE 2

Crystallization of Simultaneous Reactant of A Precipitated Calcium Carbonate And Acrylamide (PCC-PAM)

Firstly, to prepare synthesis of a polymer and a calcium carbonate, 22.7 mM of calcium hydroxide and 420 mM of acrylamide in 200 mL of solution is introduced into a reactor of double jacket, and then nitrogen gas ($N_2$) is injected at flow of 300 mL/min to the said solution to remove the dissolved oxygen and carbon dioxide and the like. The said solution is adjusted at pH of 7.0 by using sodium hydroxide, and then stirred during about 30 minutes. Then, 1 mL of ammonium persulfate, an initiator, is prepared with 0.5 mM of concentration.

A reaction is initiated by infusing carbon dioxide with a speed of 300 mL/min to the prepared solution of calcium hydroxide and acrylamide of 45° C. A sample is taken at 180 minutes after reaction by adding ammonium persulfate which is an initiator for synthesis of high molecular while infusing carbon dioxide. At 3 hours after initiation of reaction, the precipitate of a calcium carbonate is washed above 5 times, and dried at room temperature during about 12 hours to obtain a precipitated polymer and a calcium carbonate.

EXAMPLE 3

Crystallization of Simultaneous Reactant of A Precipitated Calcium Carbonate, Acrylic Acid And Acrylamide (PCC-PAA-PAM)

Firstly, to prepare synthesis of a polymer and a calcium carbonate, 22.7 mM of calcium hydroxide and 420 mM of acrylic acid and acrylamide in 200 mL of solution is introduced into a reactor of double jacket, and then nitrogen gas ($N_2$) is injected at flow of 300 mL/min to the said solution to remove the dissolved oxygen and carbon dioxide and the like. The said solution is adjusted at pH of 7.0 by using sodium hydroxide, and then stirred during about 30 minutes. Then, 1 mL of ammonium persulfate, an initiator, is prepared with 0.5 mM of concentration.

A reaction is initiated by infusing carbon dioxide with a speed of 300 mL/min to the prepared mixture solution of calcium hydroxide, acrylic acid and acrylamide of 45° C. A sample is taken at 180 minutes after reaction by adding ammonium persulfate which is an initiator for synthesis of high molecular while infusing carbon dioxide. At 3 hours after initiation of reaction, the precipitate of a calcium carbonate is washed above 5 times, and dried at room temperature during about 12 hours to obtain a precipitated polymer and a calcium carbonate.

EXAMPLE 4

Crystallization of Simultaneous Reactant of A Precipitated Calcium Carbonate, Acrylic Acid And Acrylamide (PCC-PAA, PAM)

Firstly, to prepare synthesis of a polymer and a calcium carbonate, 22.7 mM of calcium hydroxide and 210 mM of acrylic acid in 200 mL of solution is introduced into a reactor of double jacket, and then nitrogen gas ($N_2$) is injected at flow of 300 mL/min to the said solution to remove the dissolved oxygen and carbon dioxide and the like. The said solution is adjusted at pH of 7.0 by using sodium hydroxide, and then stirred during about 30 minutes. Then, 1 mL of ammonium persulfate, an initiator, is prepared with 0.5 mM of concentration.

A reaction is initiated by infusing carbon dioxide with a speed of 300 mL/min to the prepared mixture solution of calcium hydroxide and acrylic acid of 45° C. The reaction is continued during 60 minutes after reaction by adding ammonium persulfate which is an initiator for synthesis of high molecular while infusing carbon dioxide. 210 mM of acrylamide is added to the resultant reactant, and then additional reaction during 120 minute (total 180 minutes) is continued, and then a sample is taken from the reactant. At 3 hours after initiation of reaction, the precipitate of a calcium carbonate is washed above 5 times, and dried at room temperature during about 12 hours to obtain a precipitated polymer and a calcium carbonate.

EXAMPLE 5

Crystallization of Simultaneous Reactant of A Precipitated Calcium Carbonate, Acrylic Acid, Acrylamide And AOTAC (PCC-PAA-PAM-AOTAC)

Firstly, to prepare synthesis of a polymer and a calcium carbonate, 22.7 mM of calcium hydroxide and, as monomer mixture, 420 mM of acrylic acid, acrylamide and [2-(acryloyloxy)ethyl]-trimethylammonium chloride) in 200 mL of solution is introduced into a reactor of double jacket, and then nitrogen gas ($N_2$) is injected at flow of 300 mL/min to the said solution to remove the dissolved oxygen and carbon dioxide and the like. The said solution is adjusted at pH of 7.0 by using sodium hydroxide, and then stirred during about 30 minutes. Then, 1 mL of ammonium persulfate, an initiator, is prepared with 0.5 mM of concentration.

A reaction, is initiated by infusing carbon dioxide with a speed of 300 mL/min to the prepared mixture solution of calcium hydroxide, acrylic acid, acrylamide and AOTAC of 45° C. A sample is taken at 180 minutes after reaction by adding ammonium persulfate which is an initiator for synthesis of high molecular while infusing carbon dioxide. At 3 hours after initiation of reaction, the precipitate of a calcium carbonate is washed above 5 times, and dried at room temperature during about 12 hours to obtain a precipitated polymer and a calcium carbonate.

EXAMPLE 6

Crystallization, of Simultaneous Reactant of A Precipitated Calcium Carbonate, Acrylic Acid, Acrylamide And AOTAC (PCC-PAA, PAM-AOTAC)

Firstly, to prepare synthesis of a polymer and a calcium carbonate, 22.7 mM of calcium hydroxide and 168 mM of acrylic acid in 200 mL of solution is introduced into a reactor of double jacket, and then nitrogen gas ($N_2$) is injected at flow of 300 mL/min to the said solution to remove the dissolved oxygen and carbon dioxide and the like. The said solution is adjusted at pH of 7.0 by using sodium hydroxide, and then stirred during about 30 minutes. Then, 1 mL of ammonium persulfate, an initiator, is prepared with 0.5 mM of concentration.

A reaction is initiated by infusing carbon dioxide with a speed of 300 mL/min to the prepared mixture solution of calcium hydroxide and acrylic acid of 45° C. The reaction is continued during 60 minutes after reaction by adding ammonium persulfate which is an initiator for synthesis of high molecular while infusing carbon dioxide. The mixture of 168 mM of acrylamide and 84 mM of AOTAC is added to the resultant reactant, and then additional reaction during 120 minute (total 180 minutes) is continued, and then a sample is taken from the reactant. At 3 hours after initiation of reaction, the precipitate of a calcium carbonate is washed above 5 times, and dried at room temperature during about 12 hours to obtain a precipitated polymer and a calcium carbonate.

Although the preferred embodiments of the present invention have been described for illustrative purposes, those skilled in the art will appreciate that various modifications, additions and substitutions are possible, without departing from the scope and spirit of the invention as disclosed in the accompanied claims.

What is claimed is:
1. A process of preparing a mixture of a polymer and calcium carbonate having a surface charge, comprising:

preparing a solution of calcium hydroxide and one or more monomers selected from the group consisting of acrylic acid, acrylamide, and [2-(acryloyloxy)ethyl]-trimethylammonium chloride;

removing dissolved gases from the solution by injecting nitrogen ($N_2$) gas;

adjusting pH of the solution to neutral; and adding polymerization initiator to the adjusted solution while injecting carbon dioxide to the solution to produce the mixture.

2. A process of preparing the polymer/calcium carbonate mixture of claim 1, further comprising, after reaction of the last step, adding a mixture of one or more monomers selected from the group consisting of acrylic acid, acrylamide, and [2-(acryloyloxy)ethyl]-trimethylammonium chloride to the produced mixture and further reacting the same.

3. A process of preparing the polymer/calcium carbonate mixture of claim 1, wherein the initiator is ammonium persulfate.

4. A process of preparing the polymer/calcium carbonate mixture of claim 1, wherein the process further comprises washing a crystalline mixture formed by precipitation after ending a crystallization reaction, and drying the crystalline mixture.

\* \* \* \* \*